United States Patent
Park et al.

(10) Patent No.: US 9,423,861 B2
(45) Date of Patent: Aug. 23, 2016

(54) USB PERIPHERAL APPARATUS AND TRANSMISSION POWER REDUCTION METHOD THEREOF

(71) Applicant: POSTECH ACADEMY-INDUSTRY FOUNDATION, Pohang-si, Gyeongbuk (KR)

(72) Inventors: Hong June Park, Pohang-si (KR); Ki Hwan Sung, Pohang-si (KR)

(73) Assignee: POSTECH ACADEMY-INDUSTRY FOUNDATION, Pohang-Si, Gyeongbuk (KR)

( * ) Notice: Subject to any disclaimer, the term of this patent is extended or adjusted under 35 U.S.C. 154(b) by 258 days.

(21) Appl. No.: 14/346,641

(22) PCT Filed: Sep. 21, 2012

(86) PCT No.: PCT/KR2012/007579
§ 371 (c)(1),
(2) Date: Mar. 21, 2014

(87) PCT Pub. No.: WO2013/042976
PCT Pub. Date: Mar. 28, 2013

(65) Prior Publication Data
US 2014/0237282 A1    Aug. 21, 2014

(30) Foreign Application Priority Data
Sep. 21, 2011   (KR) .................. 10-2011-0095443

(51) Int. Cl.
| | |
|---|---|
| G06F 1/26 | (2006.01) |
| G06F 1/32 | (2006.01) |
| G06F 13/40 | (2006.01) |
| G06F 11/30 | (2006.01) |
| H04L 25/02 | (2006.01) |
| G06F 3/045 | (2006.01) |

(52) U.S. Cl.
CPC .......... *G06F 1/3253* (2013.01); *G06F 11/3051* (2013.01); *G06F 13/4086* (2013.01); *G06F 3/045* (2013.01); *G06F 2213/3854* (2013.01); *H04L 25/028* (2013.01); *H04L 25/0264* (2013.01); *H04L 25/0298* (2013.01); *Y02B 60/1228* (2013.01); *Y02B 60/1235* (2013.01)

(58) Field of Classification Search
CPC . G06F 3/045; G06F 13/4086; H04L 25/0264; H04L 25/0298
USPC .......................................... 713/300, 320, 323
See application file for complete search history.

(56) References Cited

U.S. PATENT DOCUMENTS 5,781,028 A * 7/1998 Decuir ............. H03K 19/01759
326/21

FOREIGN PATENT DOCUMENTS

| | | |
|---|---|---|
| JP | 2004-233202 | 8/2004 |
| JP | 2006-227867 | 8/2006 |

(Continued)

OTHER PUBLICATIONS

International Search Report for International Application No. PCT/KR2012/007579, dated Mar. 29, 2013.

*Primary Examiner* — Michael J Brown
(74) *Attorney, Agent, or Firm* — Kile Park Reed & Houtteman PLLC (57) ABSTRACT

Disclosed are a USB peripheral apparatus capable of reducing transmission power of a transmission terminal circuit by significantly increasing resistance values of terminations provided at the transmission terminal circuit and a reception terminal circuit as compared with a specific impedance value of a transmission line, and a transmission power reduction method thereof.

13 Claims, 8 Drawing Sheets

(56) References Cited

FOREIGN PATENT DOCUMENTS

| JP | 2006-262460 | 9/2006 |
| JP | 2007-193796 | 8/2007 |
| JP | 2009-49684 | 3/2009 |
| JP | 2010-287035 | 12/2010 |
| KR | 10-0672999 | 9/2006 |
| KR | 10-0822798 | 7/2007 |

* cited by examiner

USB PERIPHERAL APPARATUS AND TRANSMISSION POWER REDUCTION METHOD THEREOF

BACKGROUND OF THE INVENTION

1. Field of the Invention

The present invention relates to a USB peripheral apparatus, and more particularly, to a USB peripheral apparatus capable of reducing transmission power and a transmission power reduction method thereof.

2. Description of the Related Art

In the present time, as a USB communication scheme is extensively used in a portable mobile device and the like, a circuit used for USB communication has a large influence on power consumption of a portable apparatus.

Between a host and a device in a USB 2.0 interface, the host is a PC (Personal Computer) and the device is various types of peripheral devices including portable devices such as a memory stick, a cellular phone, a smart phone, or an iPad.

When transmission power of the circuit used for the USB communication is reduced, the use time of the portable apparatus including a battery with limited power increases.

In a USB peripheral apparatus of a USB 2.0 standard, a part using the largest power is a high speed driving circuit.

In the USB 2.0 standard, when the high speed driving circuit transmits data to an external device connected to the USB peripheral apparatus, it is necessary to maintain constant output voltage swing of 400 mV. The voltage swing value is decided by a termination resistance value of a reception circuit, a termination resistance value of a transmission circuit, and a supply current of the high speed driving circuit.

With the recommendation of the USB 2.0 standard, since the termination resistance values of a transmission termination and a reception termination are set to 45Ω, the current of the high speed driving circuit is about 18 mA in order to maintain the output voltage swing of 400 mV.

Since the current of the high speed driving circuit occupies about 40% of the total current used in the USB peripheral apparatus, when the amount of the current of the high speed driving circuit is reduced, the total power consumption of the USB peripheral apparatus is significantly reduced.

SUMMARY OF THE INVENTION

Accordingly, the present invention has been made in an effort to solve the problems occurring in the related art, and an object of the present invention is to provide a USB peripheral apparatus that allows a USB host apparatus to recognize the USB peripheral apparatus as an apparatus of a USB 2.0 standard by significantly increasing a resistance value of a termination resistor than before to reduce transmission power when the USB peripheral apparatus is in a transmission mode and by changing the resistance value of the termination resistor to an existing resistance value when the USB peripheral apparatus is in a reception mode or a standby mode, and a transmission power reduction method thereof.

In order to achieve the above object, according to one aspect of the present invention, there is provided a USB peripheral apparatus including: a transmission unit that transmits input data to an already connected external USB host apparatus when an operation mode of the USB peripheral apparatus is a transmission mode; a reception unit that receives data from the USB peripheral host when the USB peripheral apparatus is in a reception mode; a termination resistor unit that has a first resistance value and is connected to the transmission unit and the reception unit; and a control unit that detects whether the operation mode of the USB peripheral apparatus is one of the transmission mode and the reception mode, and controls the first resistance value of the termination resistor unit to be changed to a second resistance value corresponding to the detected operation mode.

In order to achieve the above object, according to one aspect of the present invention, there is provided a transmission power reduction method of a USB peripheral apparatus connected to a USB host apparatus and transmits/receives data to/from the USB host apparatus, which includes the steps of: detecting whether an operation mode of the USB peripheral apparatus is one of a transmission mode and a reception mode; changing an initial first resistance value of a termination resistor unit connected to a transmission unit of the USB peripheral apparatus to a second resistance value that is twice or more as large as the first resistance value when the USB peripheral apparatus is in the transmission mode as a result of the detection; transmitting data, which is inputted after the first resistance value is changed to the second resistance value, to the USB host apparatus; and changing the changed second resistance value to the first resistance value when the USB peripheral apparatus is in the reception mode as the result of the detection.

In accordance with the USB peripheral apparatus and the transmission power reduction method thereof according to the present invention, when the USB peripheral apparatus is in a transmission mode, a resistance value of a termination resistor is significantly increased than before, so that it is possible to significantly reduce transmission power.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

A USB peripheral apparatus of the present invention is connected to a USB host apparatus, has a speed of 480 Mbps or more, and is a high speed USB peripheral apparatus conforming to a USB 2.0 standard.

The USB peripheral apparatus according to the present invention is prepared in the form of a module or a unit, wherein the USB peripheral apparatus in the form of a module or a unit may be mounted in a portable terminal.

The portable terminal may include a cellular phone, a smart phone, a notebook computer (a laptop computer), a terminal for digital broadcasting, a PDA (Personal Digital Assistants), a PMP (Portable Multimedia Player), a navigation, a MP3 player and the like.

Figure 1:
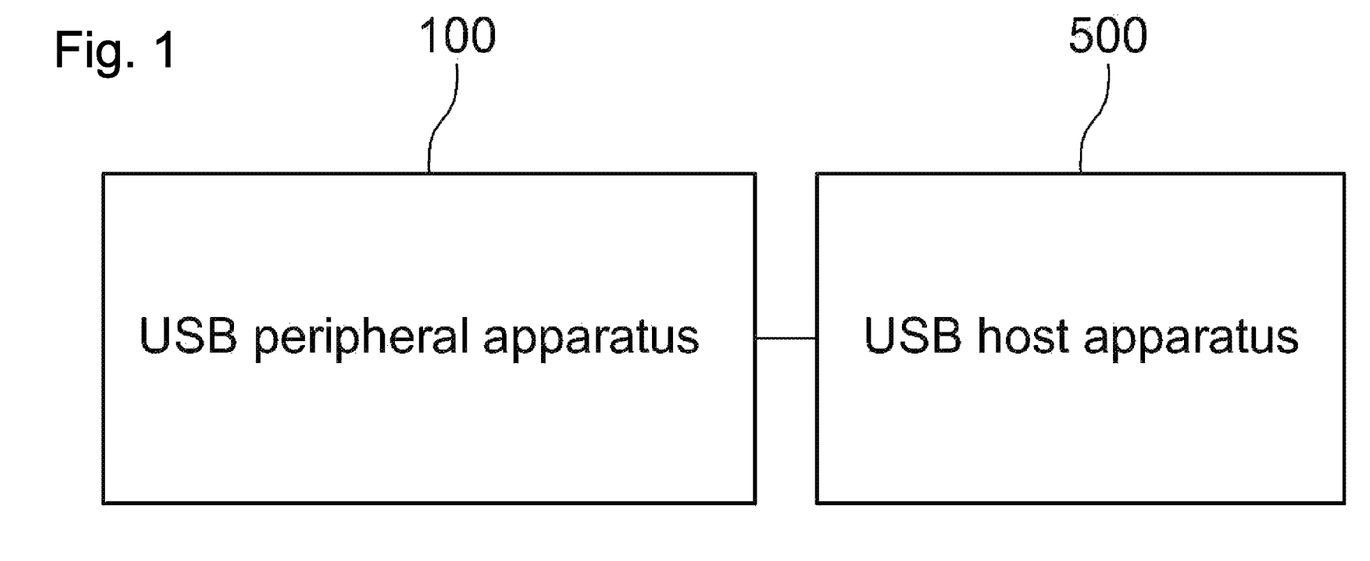
FIG. 1 is a diagram illustrating a system including a USB peripheral apparatus 100 and a USB host apparatus 500 according to the present invention.

FIG. 1 is a diagram illustrating a system including a USB peripheral apparatus 100 and a USB host apparatus 500 according to the present invention.

Referring to FIG. 1, the USB peripheral apparatus 100 is connected to the USB host apparatus 500 through a data cable in a wire manner, transmits data selected by a user from data in the USB peripheral apparatus 100 to the USB host apparatus 500 when the USB peripheral apparatus 100 is in a transmission mode, and receives data from the USB host apparatus 500 when the USB peripheral apparatus 100 is in a reception mode.

In the present invention, when the USB peripheral apparatus 100 is in the transmission mode, a resistance value of a termination connected to a transmission unit in the USB peripheral apparatus 100 is allowed to increase to a second resistance value that is twice or more as large as an initial first resistance value, so that it is possible to considerably reduce transmission power of data to be transmitted to the USB host apparatus 500.

However, when transmission voltage swing of the USB peripheral apparatus 100 is different from transmission voltage swing defined in the USB 2.0 standard, there may occur a problem that the USB host apparatus 500 may recognize that the USB peripheral apparatus 100 connected to the USB host apparatus 500 is not a high speed apparatus of the USB 2.0 standard, or a connection between the USB host apparatus 500 and the USB peripheral apparatus 100 is blocked.

In this regard, in the present invention, in the case of transmitting, to the USB host apparatus 500, a chirp signal that is used when the USB host apparatus 500 recognizes whether the USB peripheral apparatus 100 connected to the USB host apparatus 500 is a high speed apparatus of the USB 2.0 standard, transmission power of the chirp signal is changed to transmission power at the time of the existing first resistance value, thereby allowing the USB host apparatus 500 to recognize the USB peripheral apparatus 100 connected to the USB host apparatus 500 as the high speed apparatus of the USB 2.0 standard.

Furthermore, in the present invention, when the USB peripheral apparatus 100 is in the reception mode or a standby mode other than the transmission mode, the increased second resistance value is changed to the original first resistance value, thereby allowing the USB peripheral apparatus 100 connected to the USB host apparatus 500 to be recognized as the high speed apparatus of the USB 2.0 standard.

Figure 2:
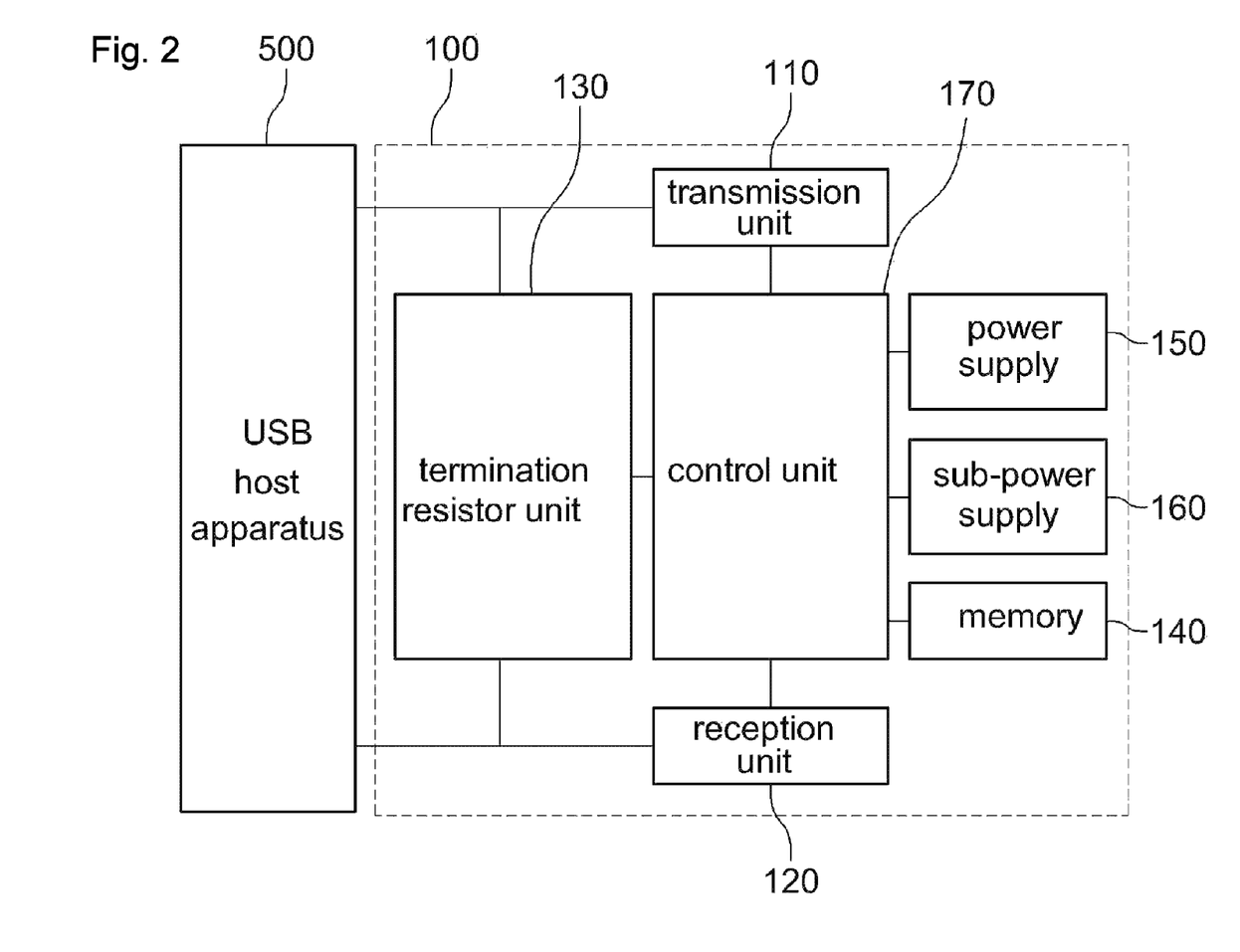
FIG. 2 is a block diagram illustrating the configuration of a USB peripheral apparatus 100 according to the present invention.

FIG. 2 is a block diagram illustrating the configuration of the USB peripheral apparatus 100 according to the present invention.

Referring to FIG. 2, the USB peripheral apparatus 100 according to the present invention includes a transmission unit 110, a reception unit 120, a termination resistor unit 130, a memory 140, a power supply 150, a sub-power supply 160, and a control unit 170.

The transmission unit 110 transmits data selected by a user to the USB host apparatus 500 under the control of the control unit 170 when the USB peripheral apparatus 100 is connected to the USB host apparatus 500.

The reception unit 120 receives data from the USB host apparatus 500.

The termination resistor unit 130 is provided to a transmission line between the transmission unit 110 and the USB host apparatus 500 and/or a transmission line between the reception unit 120 and the USB host apparatus 500, and has first and second resistance values according to the present invention.

The first resistance value of the termination resistor unit 130 is an initial resistance value and may be 45Ω written in the USB 2.0 standard, and the second resistance value is twice or more as large as the 45Ω in order to reduce the transmission power of the transmission unit 110 according to the present invention.

The termination resistor unit 130 may include variable resistors that may have the first and second resistance values, and in this case, a resistance value of the variable resistor is changed from the first resistance value to the second resistance value or from the second resistance value to the first resistance value under the control of the control unit 170.

That is, when it is detected that a current operation mode of the transmission unit 110 is the transmission mode, the control unit 170 changes the resistance value of the variable resistor from the first resistance value to the second resistance value, and when it is detected that the current operation mode of the transmission unit 110 is the reception mode or the standby mode, the control unit 170 maintains the resistance value of the variable resistor as the first resistance value or changes the second resistance value to the first resistance value.

Figure 3:
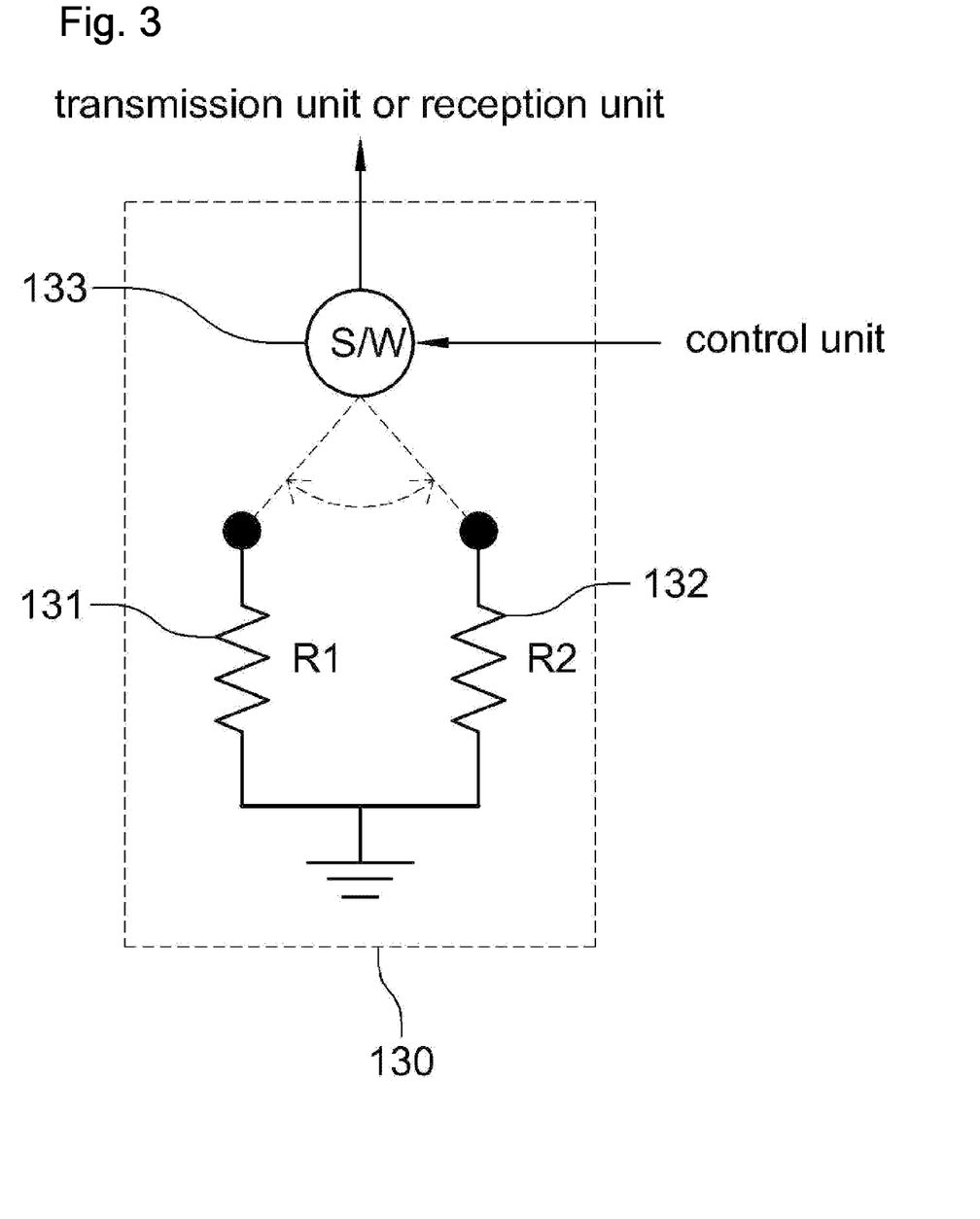
FIG. 3 is a diagram illustrating the configuration of a termination resistor unit of a USB peripheral apparatus according to the present invention.

As illustrated in FIG. 3, the termination resistor unit 130 may include first and second termination resistors 131 and 132 having the first and second resistance values, and a switching element 133 that switches the first and second termination resistors 131 and 132.

FIG. 3 is a diagram illustrating the configuration of the termination resistor unit according to the present invention.

As illustrated in FIG. 3, the termination resistor unit 130 includes the first termination resistor 131 (R1) having the initial first resistance value 45Ω the second termination resistor 132 (R2) having the second resistance value that is twice or more as large as the first resistance value, and the switching element 133 that connects one of the first and second termination resistors 131 and 132 to the transmission unit 110 or the reception unit 120 under the control of the control unit 170.

That is, when it is detected that the current operation mode of the transmission unit 110 is the transmission mode, the control unit 170 controls the switching element 133 such that the second termination resistor 132 is connected to the transmission line of the transmission unit 110, and when it is detected that the current operation mode of the transmission unit 110 is the reception mode or the standby mode, the control unit 170 controls the switching element 133 such that the first termination resistor 131 is connected to the transmission line of the reception unit 120.

The memory 140 may store a program for processing and control of the control unit 170, or may also perform a function of temporarily storing input/output data (for example, a moving image file, a music file, a data file and the like).

The power supply 150 receives power of the USB host apparatus 500 or internal power to supply power necessary for operations of the elements of the USB peripheral apparatus 100 under the control of the control unit 170.

The sub-power supply 160 supplies power to the transmission unit 110 under the control of the control unit 170 such that the transmission power of the chirp signal is existing transmission power when the transmission unit 110 transmits the chirp signal to the USB host apparatus 500.

That is, when a current period is a period of transmitting a chirp signal for informing the USB host apparatus 500 that the USB peripheral apparatus 100 is an apparatus of the USB 2.0 standard, the control unit 170 blocks power supplied from the power supply 150 to the transmission unit 110 by using transmission power supplied from the power supply 150 in the case of the second resistance value, and supplies the transmission unit 110 with transmission power supplied from the sub-power supply 160 in the case of the first resistance value, thereby allowing the USB host apparatus 500 to recognize the USB peripheral apparatus 100 as a high speed apparatus of the USB 2.0 standard.

The control unit 170 controls the general operation of the USB peripheral apparatus 100, and a detailed operation of the control unit 170 according to the present invention will be described in detail with reference to FIG. 4.

Figure 4:
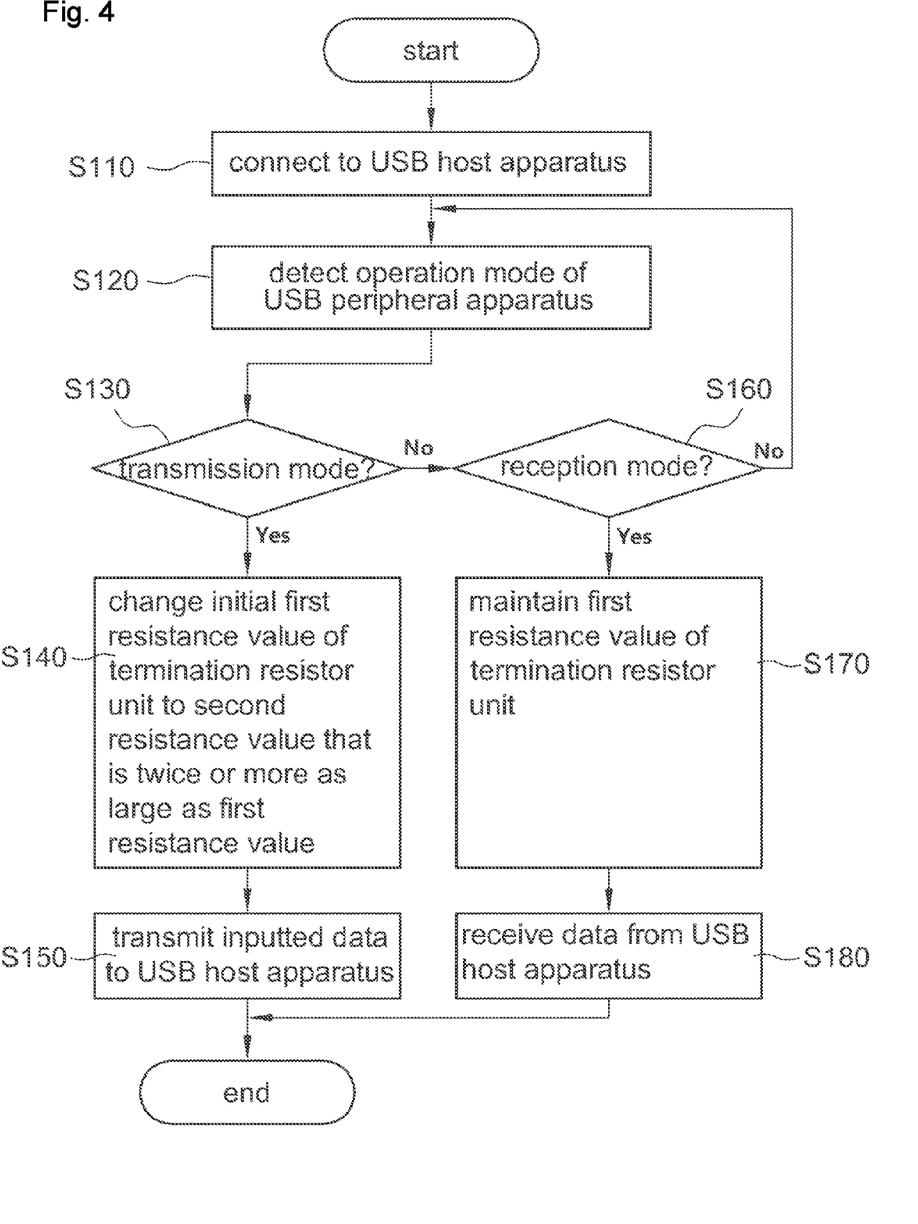
FIG. 4 is a flow diagram illustrating the transmission power reduction process of a USB peripheral apparatus according to the present invention.

FIG. 4 is a flow diagram illustrating the transmission power reduction process of the USB peripheral apparatus according to the present invention.

Referring to FIG. 4, when it is detected that the USB peripheral apparatus 100 has been connected to the USB host apparatus 500 [S110], the control unit 170 checks whether the USB peripheral apparatus 100 is a high speed apparatus through a chirp signal. When it is checked that the USB peripheral apparatus 100 is the high speed apparatus, the control unit 170 detects whether a current operation mode of the USB peripheral apparatus 100 is the transmission mode or the reception mode/the standby mode [S120].

When a transmission valid signal TXVALID is received from an upper layer SIE of a physical layer including the transmission unit 110, the reception unit 120, and the termination resistor unit 130 through a UMTI (USB 2.0 Transceiver Macrocell Interface), the control unit 170 detects that the USB peripheral apparatus 100 is in the transmission mode, and when the transmission valid signal TXVALID is not received, the control unit 170 detects that the USB peripheral apparatus 100 is in the reception mode or the standby mode.

As described above, in the case in which the USB peripheral apparatus 100 is in the transmission mode [S130], the control unit 170 changes the initial first resistance value of the termination resistor unit 130 to the second resistance value that is twice or more as large as the first resistance value [S140], and transmits data inputted or selected by a user to the USB host apparatus 500 [S150].

At this time, when the transmission voltage swing of the USB peripheral apparatus 100 is different from the transmission voltage swing defined in the USB 2.0 standard, there may occur a problem that the USB host apparatus 500 may recognize that the USB peripheral apparatus 100 connected to the USB host apparatus 500 is not the high speed apparatus of the USB 2.0 standard, or a connection between the USB host apparatus 500 and the USB peripheral apparatus 100 is blocked.

That is, for example, after the USB peripheral apparatus 100 of the USB 2.0 standard is initialized and enters a reset state, handshaking is performed between the USB host apparatus 500 and the USB peripheral apparatus 100 in order to check whether the USB peripheral apparatus 100 is an apparatus capable of performing high speed transmission/reception of the USB 2.0 standard, wherein a signal transmitted for the handshaking is called a chirp signal.

The chirp signal should have a value of 0 mV or 800 mV according to the USB 2.0 standard. However, when the transmission unit 110 transmits the chirp signal, since the termination resistor unit 130 is separated from an output terminal to which a USB cable has been connected, resistance at the output terminal is only 45Ω of the USB host apparatus 500. That is, in order to generate 800 mV (the swing voltage of the chirp signal) in the resistance 45Ω of the USB host apparatus 500, a driving current value based on the transmission power of the transmission unit 110 should be about 18 mV.

Accordingly, in the case of transmitting, to the USB host apparatus 500, the chirp signal for informing whether the USB peripheral apparatus 100 is an apparatus of the USB 2.0 standard, the sub-power supply 160 is controlled to change the transmission power of the chirp signal to transmission power in the case of the existing first resistance value, thereby allowing the USB host apparatus 500 to recognize the USB peripheral apparatus 100 as the high speed apparatus of the USB 2.0 standard.

As the detection result of step S120, in the case in which the USB peripheral apparatus 100 is in the reception mode or the standby mode [S160], the control unit 170 maintains a first resistance value when the current resistance value of the termination resistor unit 130 is the first resistance value or changes a second resistance value to the first resistance value when the current resistance value of the termination resistor unit 130 is the second resistance value [S170], and receives data from the USB host apparatus 500 [S180].

Figure 5:
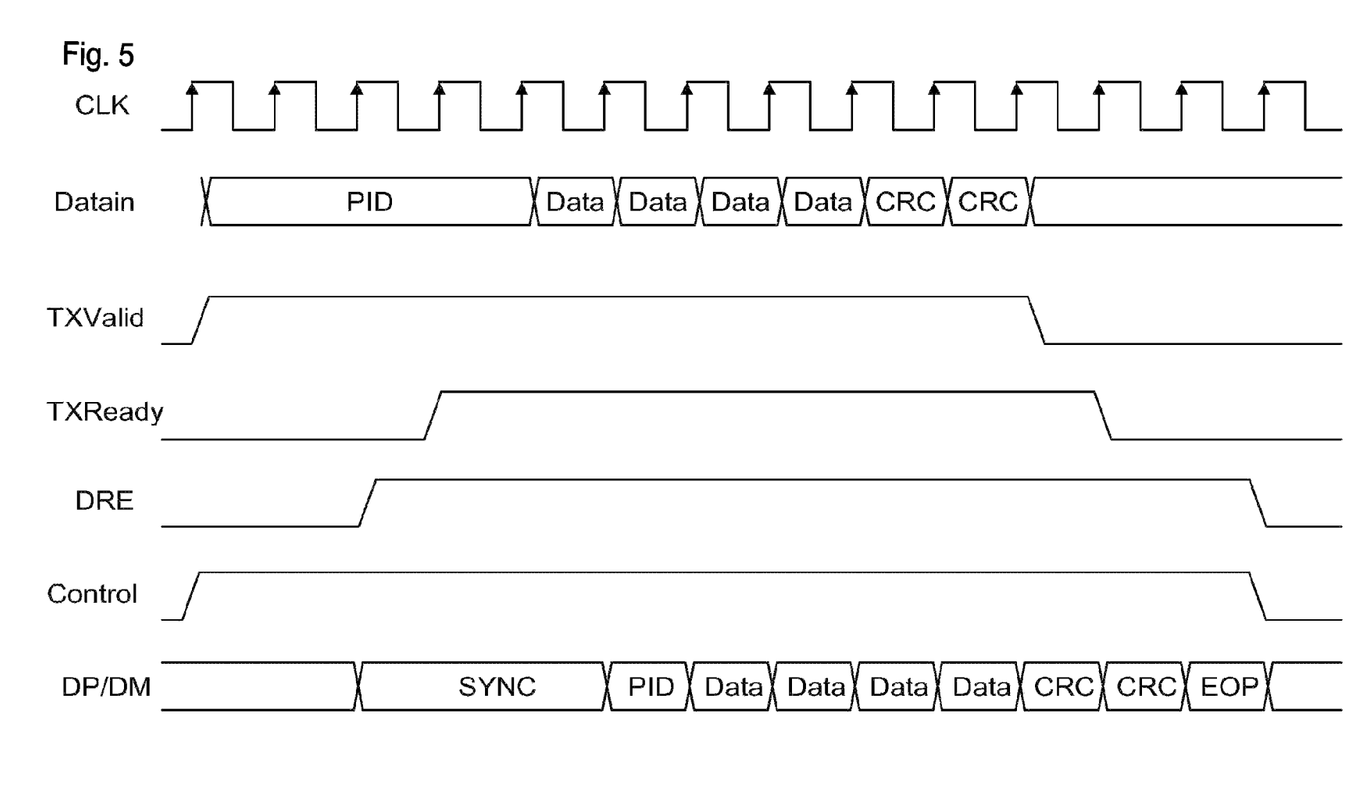
FIG. 5 is a diagram illustrating the driving timing of a USB peripheral apparatus according to the present invention.

FIG. 5 is a diagram illustrating the driving timing of the USB peripheral apparatus according to the present invention.

Referring to FIG. 5, when the transmission unit 110 of the USB peripheral apparatus 100 operates to transmit data, after the transmission valid signal TXVALID received from the upper layer SIE through the UMTI interface is changed to an activated state "1", the transmission unit 110 starts to transmit data after two clocks or three clocks of 60 MHz.

When the transmission valid signal TXVALID is changed to a deactivated state "0", the transmission unit 110 stops data transmission after three clocks of 60 MHz.

Accordingly, when referring to the transmission valid signal TXVALID received from the upper layer SIE, since there is a temporal margin of two clocks or three clocks before data transmission, the control unit 170 can recognize that the current operation mode of the USB peripheral apparatus 100 is the transmission mode, and control the termination resistor unit 130 to change the initial first resistance value to the second resistance value.

Even when a high speed driving circuit operates as a transmitter and changes an operation mode for a receiver, it is possible to change a termination resistance value of a Device PHY to a resistance value, by which accurate data can be received, by using an output signal of an FSM.

Figure 6:
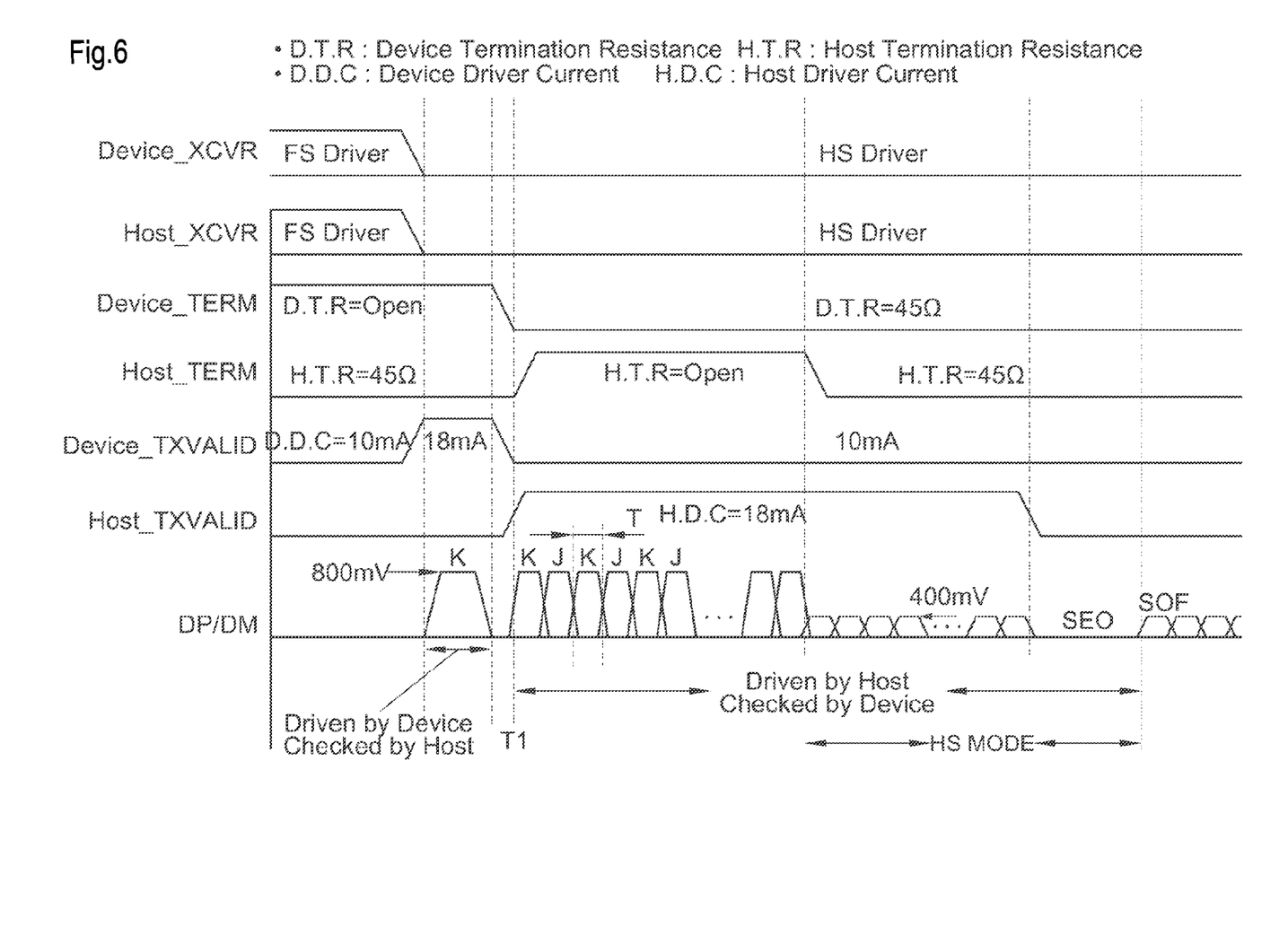
FIG. 6 is a diagram illustrating the driving timing of a transmission unit.

FIG. 6 is a diagram illustrating the driving timing of the transmission unit.

FIG. 6 illustrates timings for three control signals Device_XCVR, Device_TERM, and Device_TXVALID used when the transmission unit 110 transmits the chirp signal.

The control signals are transferred from the upper layer SIE to the USB peripheral apparatus 100 through the UTMI interface.

The Device_XCVR selects one of a full-speed (12 Mbps) driver and a high speed (480 Mbps) driver. That is, when the Device_XCVR is '1', the full-speed (12 Mbps) driver is selected, and when the Device_XCVR is '0', the high speed (480 Mbps) driver is selected.

In the case of using a signal DRE, when the DRE is '1', the full-speed (12 Mbps) driver or the high speed (480 Mbps) driver selected by the signal XCVR is available as the transmission unit 110. When the DRE is '0', the full-speed (12 Mbps) driver and the high speed (480 Mbps) driver are turned off regardless of the signal XCVR and operate as the reception unit 120.

The signal Device_TERM is used only in the chirp operation, and connects the termination resistor unit 130 to the USB signal voltage terminals DP and DM or separates the termination resistor unit 130 from the USB signal voltage terminals DP and DM. That is, when the Device_TERM is '1', the termination resistor unit 130 is separated from the terminals DP and DM. The case, in which the Device_TERM is '1', is generated only in the chirp signal transmission operation.

When a signal CONTROL generated using the Device_TXVALID in the memory is '1', it indicates that the USB peripheral apparatus 100 is in the transmission mode. That is, when the signal CONTROL is '1', the first resistance value (for example, 45Ω) of the termination resistor unit 130 (D.T.R of FIG. 6) is changed to the second resistance value (for example, 50Ω), and when the signal CONTROL is '0', the resistance value of the termination resistor unit 130 (D.T.R of FIG. 6) is adjusted to the existing first resistance value (for example, 45Ω).

The DP and the DM indicate differential signals of the USB output terminal. A SE0 indicates the standby mode and the state in which the DP and DM terminal signals are '0', J indicates the state in which the DP and DM terminal signals are '1' and '0', and K indicates the state in which the DP and DM terminal signals are '0' and '1'.

When the signal XCVR is '0', the USB peripheral apparatus 100 is enabled, when the signal Device TERM is '1', the termination resistor unit 130 is separated from the USB signal terminals DP and DM, and when the signal CONTROL is '1', the operation mode of the USB peripheral apparatus 100 is the transmission mode, so that the transmission unit 110 transmits the signal K (DP '0' and DM '1') to the USB host apparatus 500 through the USB signal terminals.

The USB host apparatus 500 checks whether a voltage of the chirp signal received from the USB peripheral apparatus 100 is in the range of 0.7 V or more and 1.1 V or less. When the voltage of the chirp signal is in the range, the USB host apparatus 500 determines that the USB peripheral apparatus 100 of the USB 2.0 standard has been connected.

Figure 7:
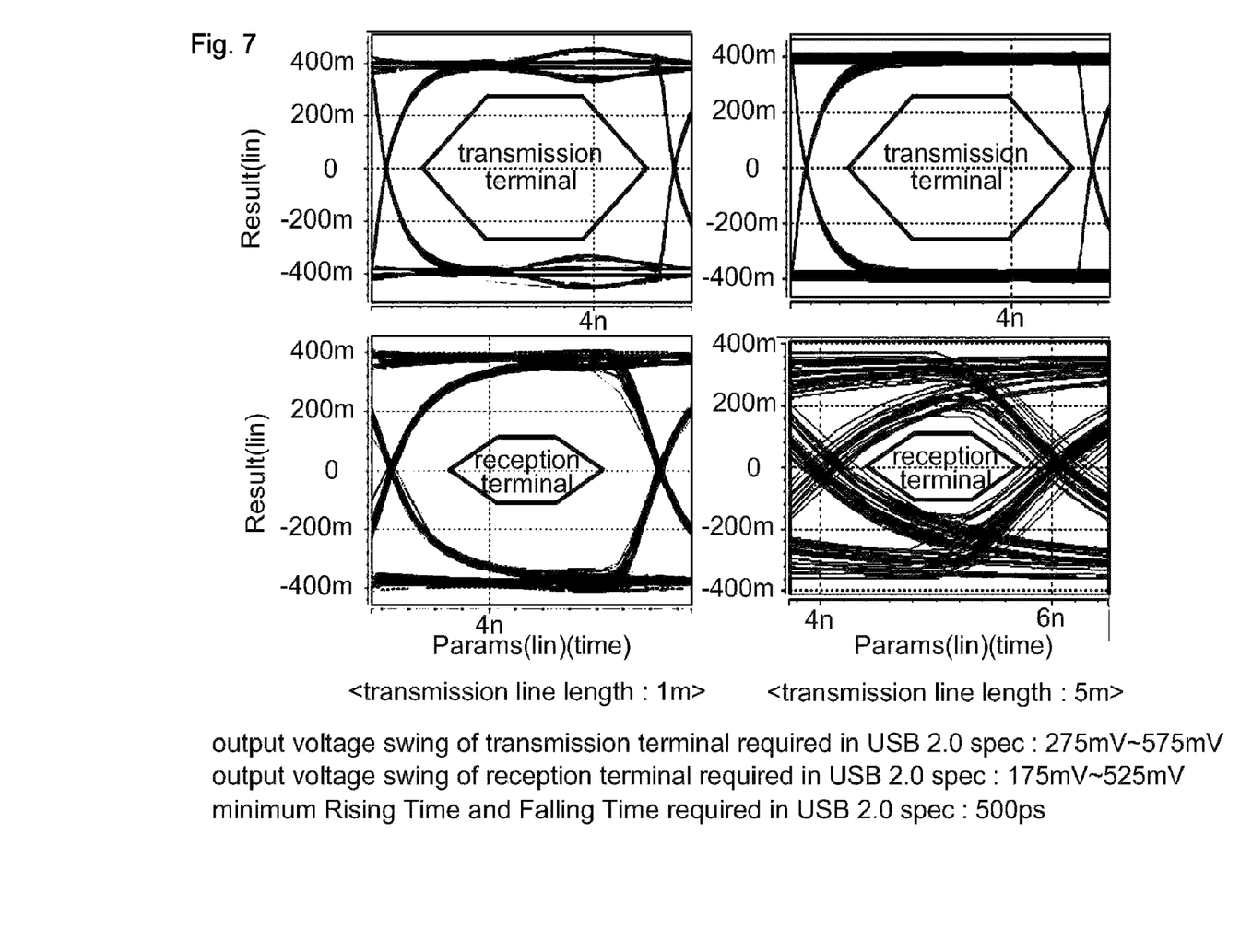
FIG. 7 is an EYE diagram for voltages of USB terminals DP and DM through SPICE simulation when a USB peripheral apparatus according to the present invention is in a transmission mode.

FIG. 7 is an EYE diagram for voltages of the USB terminals DP and DM through SPICE simulation when the USB peripheral apparatus according to the present invention is in the transmission mode.

A transmission terminal of FIG. 7 is the USB peripheral apparatus 100 and a reception terminal is the USB host apparatus 500.

In order to satisfy the USB 2.0 specification, when data is transmitted to the USB peripheral apparatus 100 having a transmission line of 5 m, a positive voltage level at the termination resistor unit 130 connected to the transmission unit 110 should be in the range of 275 mV or more and 575 mV or less.

Furthermore, a positive voltage level at the termination resistor unit 130 connected to the reception unit 120 should be in the range of 175 mV or more and 525 mV or less.

As illustrated in FIG. 7, the USB peripheral apparatus 100 according to the present invention satisfies the EYE SPEC conditions defined in the USB 2.0 standard.

Figure 8:
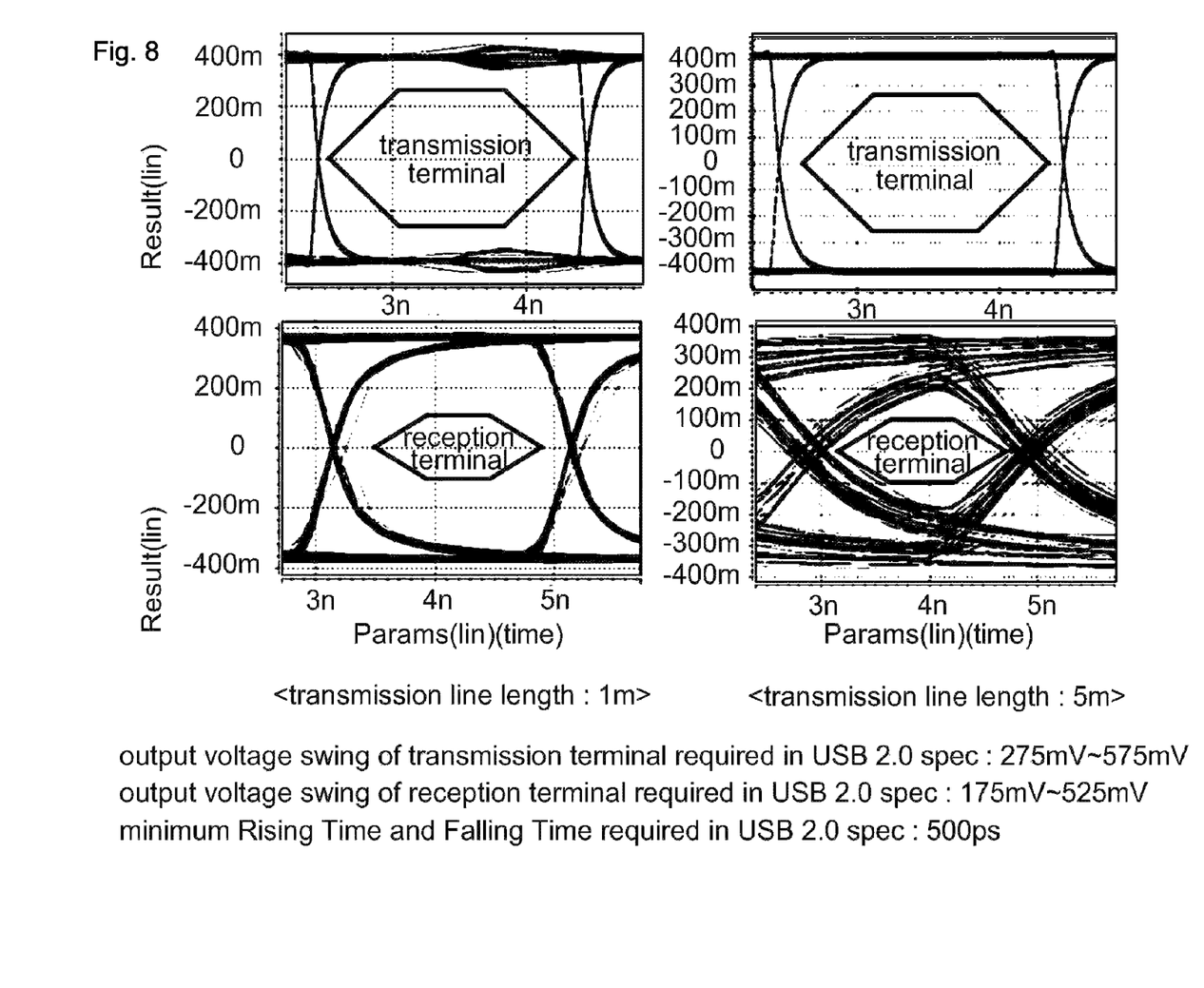
FIG. 8 is an EYE diagram for voltages through SPICE simulation when a USB peripheral apparatus according to the present invention is in a reception mode.

FIG. 8 is an EYE diagram for voltages through the SPICE simulation when the USB peripheral apparatus according to the present invention is in the reception mode.

As illustrated in FIG. 8, it is noted that the USB peripheral apparatus 100 according to the present invention satisfies the USB 2.0 standard even when the USB peripheral apparatus 100 is in the reception mode.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A USB peripheral apparatus comprising:
    a transmission unit that transmits input data to an already connected external USB host apparatus when an operation mode of the USB peripheral apparatus is a transmission mode;
    a reception unit that receives data from the USB host apparatus when the USB peripheral apparatus is in a reception mode;
    a termination resistor unit that is connected to the transmission unit and the reception unit; and
    a control unit that detects whether the operation mode of the USB peripheral apparatus is one of the transmission mode and the reception mode, controls the termination resistor unit to have a first resistance value when the detected operation mode is the reception mode, and controls the termination resistor unit to have a second resistance value when the detected operation mode is the transmission mode,
    wherein the second resistance value is greater than the first resistance value.

2. The USB peripheral apparatus according to claim 1, wherein the USB peripheral apparatus is a high speed USB peripheral apparatus of a USB 2.0 standard of 480 Mbps or more.

3. The USB peripheral apparatus according to claim 1, wherein, when a transmission valid signal TXVALID is received through a UMTI (USB 2.0 Transceiver Macrocell Interface) of the USB peripheral apparatus, the control unit detects that the operation mode of the USB peripheral apparatus is the transmission mode by using a signal CONTROL generated using the transmission valid signal in a memory, and when the transmission valid signal is not received, the control unit detects that the operation mode of the USB peripheral apparatus is the reception mode by using the signal CONTROL generated using the transmission valid signal in the memory.

4. The USB peripheral apparatus according to claim 1, wherein, when the USB peripheral apparatus is in the reception mode or a standby mode other than the transmission mode, the control unit controls the termination resistor unit to have the first resistance value.

5. The USB peripheral apparatus according to claim 1, wherein, when the USB peripheral apparatus is in the transmission mode, the control unit controls the termination resistor unit to have the second resistance value that is twice or more as large as the first resistance value, thereby reducing transmission power of the transmission unit.

6. The USB peripheral apparatus according to claim 5, wherein, in a state in which the USB peripheral apparatus is in the transmission mode, the control unit changes transmission power of a chirp signal for handshaking to transmission power in a case of the first resistance value during a period in which the USB peripheral apparatus transmits the chirp signal to the USB host apparatus.

7. The USB peripheral apparatus according to claim 1, wherein the termination resistor unit comprises:
a variable resistor that has a resistance value that is changed to the first resistance value and the second resistance value,
wherein, when the USB peripheral apparatus is in the transmission mode, the control unit controls the resistance value of the variable resistor to have the second resistance value.

8. The USB peripheral apparatus according to claim 1, wherein the termination resistor unit comprises:
a first termination resistor that has the first resistance value;
a second termination resistor that has the second resistance value; and
a switching element that switches the first termination resistors and the second termination resistor,
wherein, when the USB peripheral apparatus is in the transmission mode, the control unit controls the switching element such that the transmission unit is connected to the second termination resistor.

9. A transmission power reduction method of a USB peripheral apparatus connected to a USB host apparatus and transmits/receives data to/from the USB host apparatus, comprising the steps of:
detecting whether an operation mode of the USB peripheral apparatus is one of a transmission mode and a reception mode;
controlling a termination resistor unit connected to a transmission unit of the USB peripheral apparatus to have a second resistance value that is twice or more as large as a first resistance value when the USB peripheral apparatus is in the transmission mode as a result of the detection;
transmitting data, which is inputted after the termination resistor unit is controlled to have the second resistance value, to the USB host apparatus; and
controlling the termination resistor unit to have the first resistance value when the USB peripheral apparatus is in the reception mode as the result of the detection,
wherein the second resistance value is greater than the first resistance value.

10. The transmission power reduction method of the USB peripheral apparatus according to claim 9, wherein the USB peripheral apparatus is a high speed USB peripheral apparatus of a USB 2.0 standard of 480 Mbps or more.

11. The transmission power reduction method of the USB peripheral apparatus according to claim 9, wherein, in the step of detecting, when a transmission valid signal TXVALID is received through a UMTI interface of the USB peripheral apparatus, a memory processes the transmission valid signal and it is detected that the operation mode of the USB peripheral apparatus is the transmission mode through a control unit, and when the transmission valid signal TXVALID is not received, the memory processes the transmission valid signal and it is detected that the operation mode of the USB peripheral apparatus is the reception mode through the control unit.

12. The transmission power reduction method of the USB peripheral apparatus according to claim 9, further comprising a step of:
controlling the termination resistor unit to have the first resistance value when the USB peripheral apparatus is in a standby mode.

13. The transmission power reduction method of the USB peripheral apparatus according to claim 9, further comprising a step of:
changing transmission power of a chirp signal for handshaking to transmission power in a case of the first resistance value during a period in which the USB peripheral apparatus transmits the chirp signal to the USB host apparatus in a state in which the USB peripheral apparatus is in the transmission mode.

* * * * *